United States Patent
Macfarlane et al.

(10) Patent No.: US 10,364,735 B2
(45) Date of Patent: Jul. 30, 2019

(54) METHOD FOR ADJUSTING VEHICLE GRILLE SHUTTERS BASED ON VEHICLE SPEED AND DIRECTION OF GRILLE SHUTTER ADJUSTMENT

(71) Applicant: Ford Global Technologies, LLC, Dearborn, MI (US)

(72) Inventors: Kevin Macfarlane, Northville, MI (US); Christopher Semanson, Dearborn, MI (US); Joseph James Gallo, Fraser, MI (US); Mark Fleming, Farmington Hills, MI (US); Colby Jason Buckman, Brownstown, MI (US); Robert Roy Jentz, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1042 days.

(21) Appl. No.: 14/092,546

(22) Filed: Nov. 27, 2013

(65) Prior Publication Data

US 2015/0147949 A1 May 28, 2015

(51) Int. Cl.
*F01P 1/06* (2006.01)
*F01P 7/10* (2006.01)
*B60K 11/08* (2006.01)

(52) U.S. Cl.
CPC .............. *F01P 7/10* (2013.01); *B60K 11/085* (2013.01); *Y02T 10/88* (2013.01)

(58) Field of Classification Search
CPC ....... B60K 11/085; F01P 7/10; F01P 2025/32; F01P 2025/66; B60R 2019/527; B60Y 2200/90; B60Y 2200/92; B60Y 2306/09; F02B 77/00; G06F 17/00; Y02T 10/88

USPC ......... 701/49, 101, 36; 180/68.1; 123/188.1; 165/41; 454/75; 49/79.1
See application file for complete search history.

(56) References Cited

U.S. PATENT DOCUMENTS 3,777,808 A * 12/1973 Izumi ................... B60K 11/02
165/271
3,845,700 A * 11/1974 Lefeuvre ............ B60H 1/00764
454/143

(Continued)

FOREIGN PATENT DOCUMENTS

JP         61218713 A   *   9/1986   ................ F01P 7/12

OTHER PUBLICATIONS

MacFarlane, Kevin et al., "Method and Systems for Adjusting Grille Shutters Based on Temperature and Position Feedback," U.S. Appl. No. 14/092,546, filed Nov. 27, 2013, 51 pages.

(Continued)

*Primary Examiner* — Gregory L Huson
*Assistant Examiner* — Phillip Decker
(74) *Attorney, Agent, or Firm* — Julia Voutyras; McCoy Russell LLP

(57) ABSTRACT

Methods and systems are provided for adjusting vehicle grille shutters based on a direction of motion of the grille shutters. In one example, a method includes adjusting a motor coupled to the grille shutters based on the direction of motion of the grille shutters, a desired opening of the grille shutters, and vehicle speed. Further, the method may include determining the direction of motion of the grille shutters based on a desired motor position relative to an actual motor position.

6 Claims, 5 Drawing Sheets

(56) References Cited

U.S. PATENT DOCUMENTS

| | | | | |
|---|---|---|---|---|
| 4,365,663 A * | 12/1982 | Inoue | B60H 1/00835 | 165/202 |
| 4,460,213 A * | 7/1984 | Janssen | B60K 11/085 | 296/180.5 |
| 8,091,668 B2 * | 1/2012 | Amano | B60K 6/445 | 180/68.1 |
| 8,311,708 B2 * | 11/2012 | Kerns | F01P 7/10 | 701/101 |
| 8,505,660 B2 * | 8/2013 | Fenchak | B60K 11/085 | 180/68.1 |
| 8,667,931 B2 * | 3/2014 | Kerns | F01P 7/10 | 123/41.05 |
| 8,689,917 B2 * | 4/2014 | Miesterfeld | F01P 7/10 | 180/68.1 |
| 9,110,896 B2 * | 8/2015 | Jeong | G06F 11/30 | |
| 9,174,527 B2 * | 11/2015 | Hayakawa | B60K 11/085 | |
| 9,404,450 B2 * | 8/2016 | Sugimoto | B01D 53/66 | |
| 9,409,474 B2 * | 8/2016 | Macfarlane | F01P 7/12 | |
| 9,657,632 B2 * | 5/2017 | Abeska | F01P 7/12 | |
| 9,670,824 B2 * | 6/2017 | Sowards | F01P 7/10 | |
| 9,676,269 B2 * | 6/2017 | Jeong | B60K 11/04 | |
| 9,701,191 B2 * | 7/2017 | Yoshioka | B60K 11/085 | |
| 9,726,067 B2 * | 8/2017 | Hakeem | F01P 7/10 | |
| 9,770,974 B2 * | 9/2017 | Asano | B60K 11/085 | |
| 2006/0095178 A1 * | 5/2006 | Guilfoyle | B60K 11/085 | 701/36 |
| 2009/0126378 A1 * | 5/2009 | Oh | F25B 25/005 | 62/115 |
| 2010/0147611 A1 | 6/2010 | Amano et al. | | |
| 2011/0005851 A1 * | 1/2011 | Doroghazi | B60K 11/085 | 180/68.1 |
| 2011/0118945 A1 | 5/2011 | Mochizukil | | |
| 2011/0137530 A1 | 6/2011 | Kerns | | |
| 2011/0247779 A1 * | 10/2011 | Charnesky | B60K 11/085 | 165/41 |
| 2011/0281515 A1 * | 11/2011 | Lockwood | B60K 11/085 | 454/75 |
| 2011/0288717 A1 * | 11/2011 | Yu | B60K 11/085 | 701/31.4 |
| 2012/0097464 A1 | 4/2012 | Waugh | | |
| 2012/0100790 A1 * | 4/2012 | Miesterfeld | F01P 7/10 | 454/75 |
| 2013/0036991 A1 * | 2/2013 | Kerns | F01P 7/10 | 123/41.04 |
| 2013/0046445 A1 * | 2/2013 | Nishimura | B60H 1/3208 | 701/49 |
| 2013/0110356 A1 * | 5/2013 | Konishi | B60K 11/085 | 701/49 |
| 2013/0184943 A1 * | 7/2013 | Sato | B60H 1/00978 | 701/49 |
| 2013/0247862 A1 | 9/2013 | Sakai | | |
| 2013/0268164 A1 | 10/2013 | Sugiyama | | |
| 2013/0275009 A1 * | 10/2013 | Sakai | B60K 11/085 | 701/49 |
| 2013/0338870 A1 * | 12/2013 | Farmer | B60K 11/085 | 701/29.2 |
| 2014/0370795 A1 * | 12/2014 | Klop | B60H 1/242 | 454/75 |
| 2015/0343894 A1 * | 12/2015 | Yoshioka | B60K 11/085 | 180/68.1 |
| 2017/0045255 A1 * | 2/2017 | Karamanos | G05D 7/0635 | |
| 2017/0120743 A1 * | 5/2017 | Dudar | B60K 11/085 | |

OTHER PUBLICATIONS

Pursifull, Ross D., "Method and System for Reducing Charge Air Cooler Condensate Using a Secondary Intake Throttle," U.S. Appl. No. 14/084,295, filed Nov. 19, 2013, 38 pages.

Sowards, John et al., "Active Grille Shutter System with a Staged Progressive Linkage to Reduce Engine Misfire From Charge Air Cooler Condensation," U.S. Appl. No. 13/857,365, filed Apr. 5, 2013, 43 pages.

Styles, Daniel J. et al., "Engine Cooling Fan to Reduce Charge Air Cooler Corrosion," U.S. Appl. No. 13/656,471, filed Oct. 19, 2012, 44 pages.

Surnilla, Gopichandra et al., "Engine Control Coordination With Grille Shutter Adjustment and Ambient Conditions," U.S. Appl. No. 13/656,542, filed Oct. 19, 2012, 33 pages.

Styles, Daniel J. et al., "Charge Air Cooler (CAC) Corrosion Reduction Utilizing Grille Shutters," U.S. Appl. No. 13/656,524, filed Oct. 19, 2012, 33 pages.

Shigarkanthi, V. et al., "Application of Design of Experiments and Physics Based Approach in the Development of Aero Shutter Control Algorithm," SAE International Paper Series No. 2011-01-0155, SAE International, Apr. 12, 2011, 8 pages.

* cited by examiner

METHOD FOR ADJUSTING VEHICLE GRILLE SHUTTERS BASED ON VEHICLE SPEED AND DIRECTION OF GRILLE SHUTTER ADJUSTMENT

BACKGROUND/SUMMARY

A vehicle grille is typically located at a front end of a vehicle, and can be configured to provide an opening through with intake air is received from outside of the vehicle, such as a grille opening or bumper opening. Such intake air may then be directed to an engine compartment of the vehicle to assist the vehicle's cooling system in cooling the engine, transmission, and other such components of the engine compartment. Such air flow via the grille may add aerodynamic drag when the vehicle is in motion. Accordingly, grilles may include grille shutters to block such air flow, thus reducing aerodynamic drag and improving fuel economy. Closed grill shutters may also provide a faster powertrain warm-up which may improve fuel economy since there is less friction, and may improve the performance of the passenger compartment heater. However, closed grille shutters also reduce the air flow through the radiator and other components for cooling purposes. As a result, engine temperatures such as engine coolant temperature (ECT) may increase. Thus, grille shutter operation may include increasing or decreasing the opening of the grille shutters based on engine cooling demands and vehicle driving conditions.

One example approach for adjusting grille shutters to increase fuel economy is shown by Kerns et al. in U.S. Pat. No. 8,311,708. Therein, vehicle grille shutters are adjusted in response to engine temperature and a non-driven vehicle condition. For example, when engine temperature is above a threshold temperature or the vehicle is decelerating, the grille shutters may be opened.

However, gear lash in the grille shutter system may result in differences between a commanded position of the grille shutters and the actual resulting position of the grill shutters. For example, a motor may adjust the grille shutters through a series of gears. However, the gears may include an amount of lash resulting in reduced accuracy of grille shutter positioning. A single map or relationship between desired grille shutter position and commanded grille shutter position may be used to adjust the grille shutters to a position close to the desired position. However, this relationship may change based on the direction of travel of the grille shutters (e.g., opening or closing), thereby resulting in decreased grille shutter position control.

In one example, the issues described above may be addressed by a method for adjusting a motor coupled to grille shutters based on a direction of motion of the grille shutters, a desired opening of the grille shutters, and vehicle speed. In this way, a position error between a commanded grille shutter position and the resulting grille shutter position may be reduced, thereby increasing vehicle fuel economy while providing adequate cooling to the engine.

As one example, unique opening and closing maps (or relationships) may be stored within a memory of a controller of the engine. The unique opening and closing maps may include a commanded percentage opening or closing (depending on the chosen map) corresponding to a desired percentage opening or closing at a current vehicle speed. In one example, the map may be stored at a look-up table within the memory of the controller. The opening or closing map for determining the commanded grille shutter position may be determined based on a desired motor position relative to a current or previously desired motor position. For example, if a difference between the desired motor position (based on desired grille shutter position) and the current (e.g., actual) motor position is greater than one motor increment, the controller may use the opening map to determine the commanded grille shutter position. However, if instead a difference between the current motor position and the desired motor position is greater than one motor increment, the controller may use the closing map to determine the commanded grille shutter position. In this way, determining the commanded grille shutter position based on the desired grille shutter position, as well as vehicle speed and the direction of motion of the grille shutters, may result in an actual grille shutter position closer to the commanded grille shutter position. As a result, fuel economy may be increased along with accuracy of engine temperature control.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
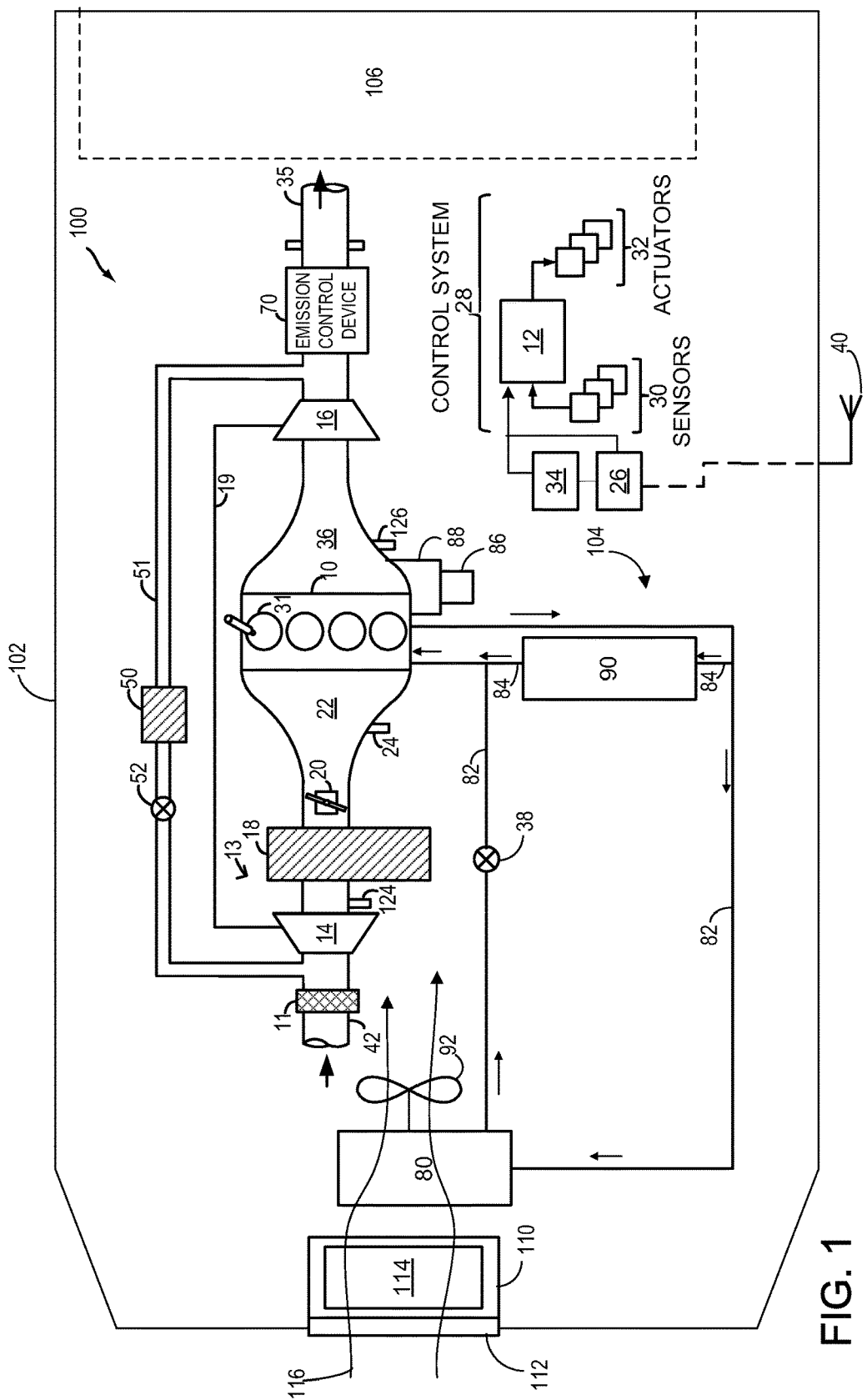
FIG. 1 shows a schematic diagram of a grille shutter system, engine, and associated components in a vehicle.
Figure 2:
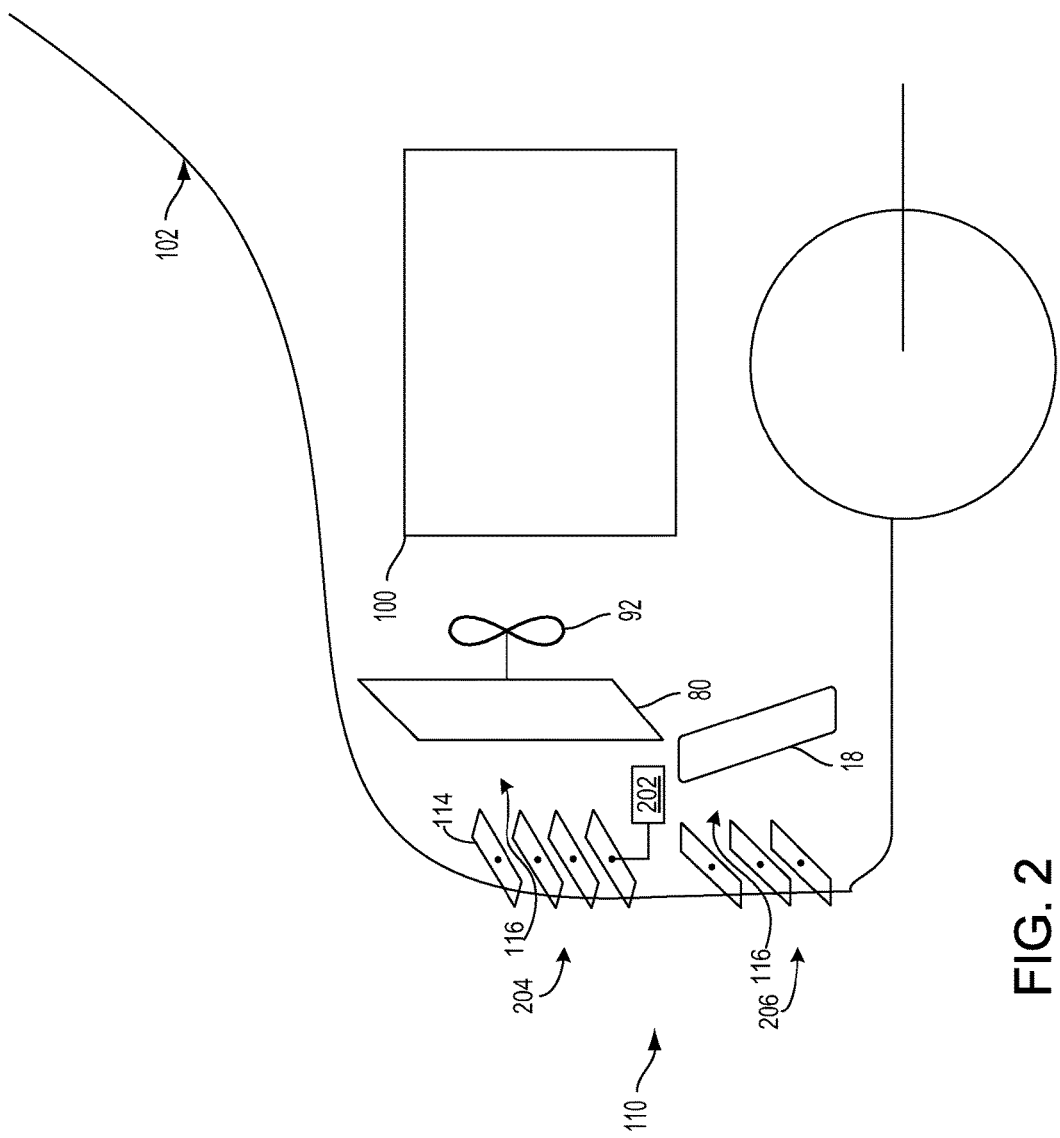
FIG. 2 shows an example of a CAC, radiator, and engine location within a vehicle with respect to the grille shutters and associated ambient airflow.
Figure 4:
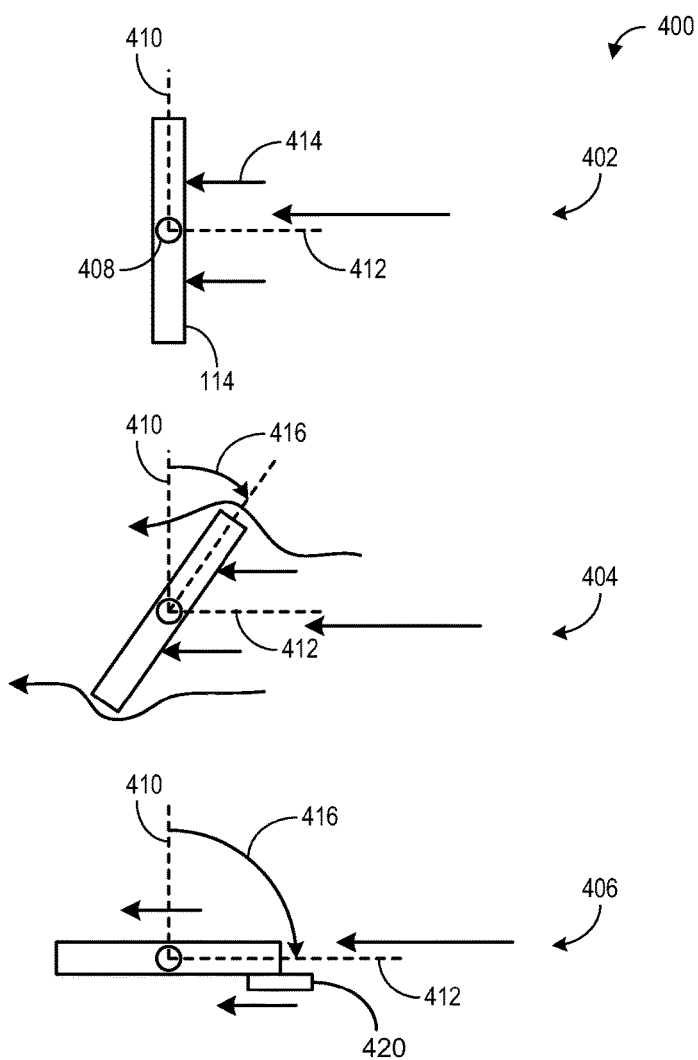
FIG. 4 shows a schematic of different grille shutter vane positions.
Figure 5:
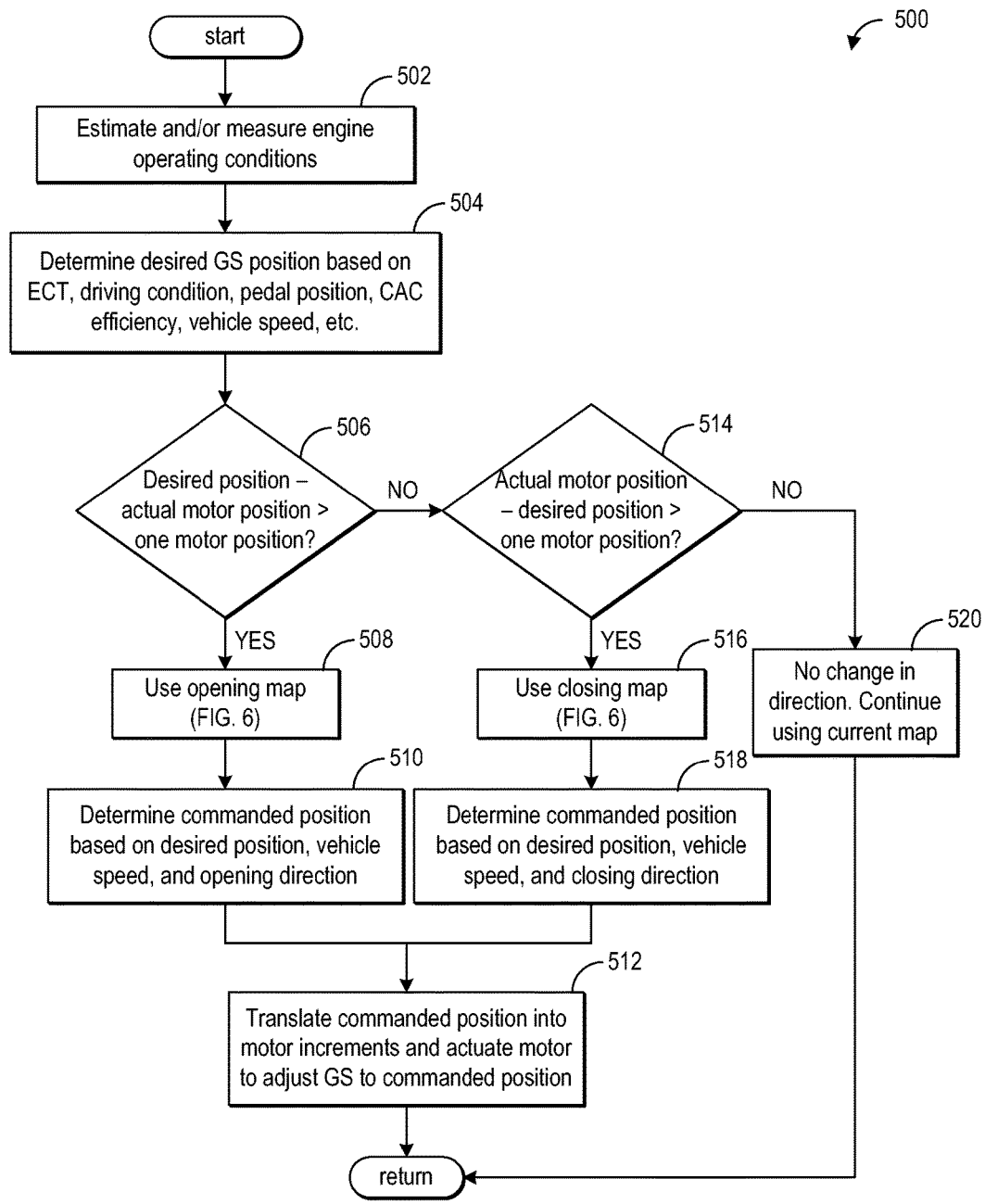
FIG. 5 shows a method for adjusting the grille shutters based on a direction of motion of the grille shutters.
Figure 6:
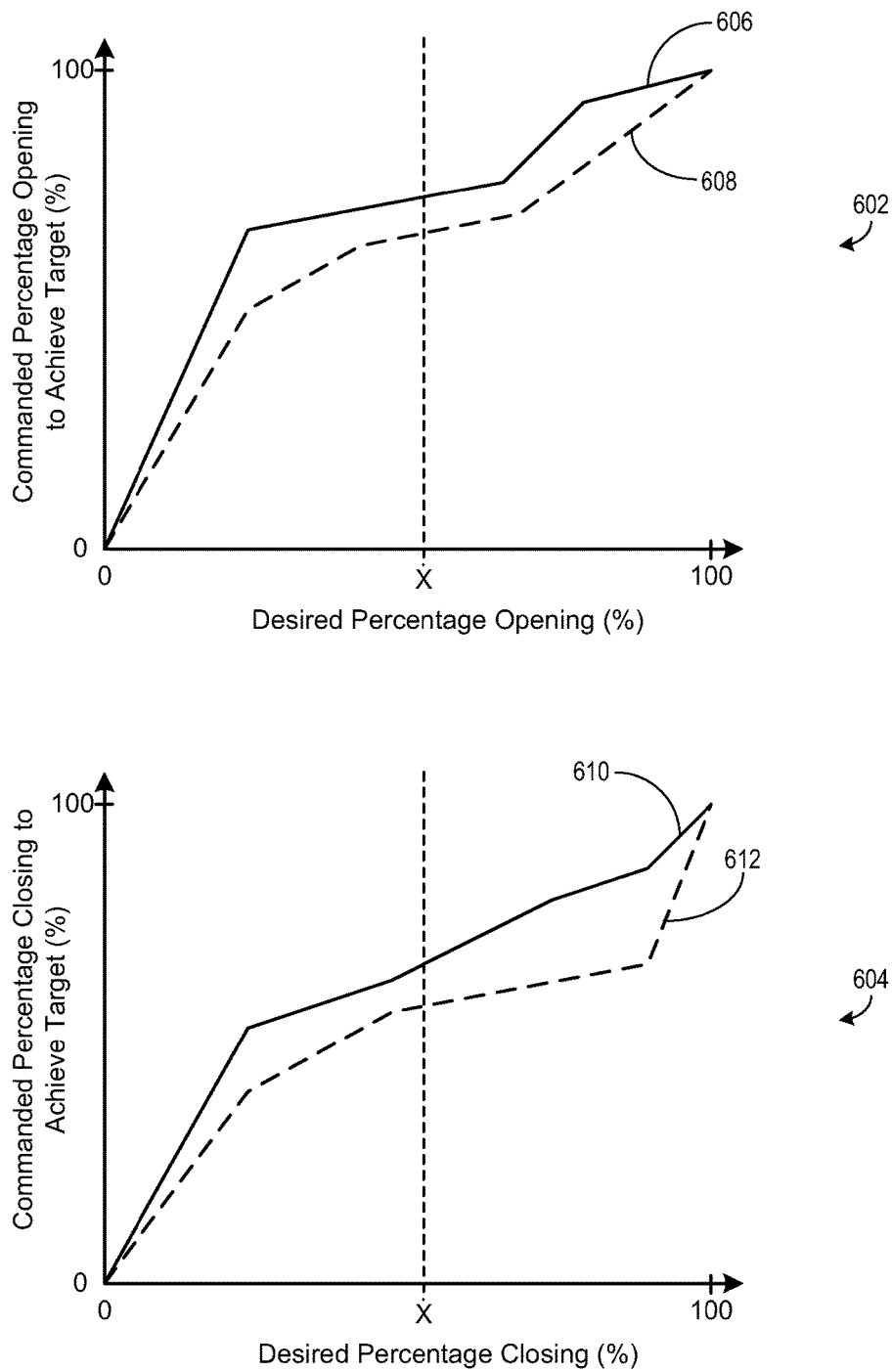
FIG. 6 show example position maps for determining a commanded grille shutter position.

The following description relates to systems and methods for adjusting vehicle grille shutters to adjust cooling to an engine system, such as the engine system shown in FIG. 1. Vehicle grille shutters may be positioned at a grille of a front end of a vehicle, as shown at FIG. 2. A percentage opening of the grille shutters may be adjusted based on engine operating conditions in order to increase or decrease cooling airflow to the engine. Specifically, an engine controller may send a commanded grille shutter position to a motor coupled to the grille shutters, such as the motor shown in FIG. 3. The motor may then adjust the grille shutters into the commanded position. Different grille shutter positions are shown at FIG. 4 with respect to an opening angle of the grille shutters. In some cases, the actual resulting grille shutter position after adjusting the grille shutters may be different than the commanded grille shutter position (resulting in a position error). This position error may be due to gear lash in the grille shutters system and may change based on vehicle speed and the direction of travel of the grille shutters (e.g., whether the grille shutters are opening or closing). FIG. 5 shows a method for adjusting the grille shutters based on the direction of motion of the grille shutters (e.g., direction of adjusting the grille shutters). Different opening and closing maps for determining the commanded grille shutter position are shown at FIG. 6

FIG. 1 shows an example embodiment of a grille shutter system 110 and an engine system 100, in a motor vehicle 102, illustrated schematically. Engine system 100 may be included in a vehicle such as a road vehicle, among other types of vehicles. While the example applications of engine system 100 will be described with reference to a vehicle, it should be appreciated that various types of engines and vehicle propulsion systems may be used, including passenger cars, trucks, etc.

In the depicted embodiment, engine 10 is a boosted engine coupled to a turbocharger 13 including a compressor 14 driven by a turbine 16. Specifically, fresh air is introduced along intake passage 42 into engine 10 via air cleaner 11 and flows to compressor 14. The compressor may be a suitable intake-air compressor, such as a motor-driven or driveshaft driven supercharger compressor. In the engine system 100, the compressor is shown as a turbocharger compressor mechanically coupled to turbine 16 via a shaft 19, the turbine 16 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed and other operating conditions.

As shown in FIG. 1, compressor 14 is coupled, through charge air cooler (CAC) 18 to throttle valve 20. The CAC may be an air-to-air or air-to-water heat exchanger, for example. Throttle valve 20 is coupled to engine intake manifold 22. From the compressor, the hot compressed air charge enters the inlet of the CAC 18, cools as it travels through the CAC, and then exits to pass through the throttle valve to the intake manifold. Ambient airflow 116 from outside the vehicle may enter engine 10 through a grille 112 at a vehicle front end and pass across the CAC, to aid in cooling the charge air. Condensate may form and accumulate in the CAC when the ambient air temperature decreases, or during humid or rainy weather conditions, where the charge air is cooled below the water dew point. When the charge air includes recirculated exhaust gasses, the condensate can become acidic and corrode the CAC housing. The corrosion can lead to leaks between the air charge, the atmosphere, and possibly the coolant in the case of water-to-air coolers. Additionally, condensate may collect at the bottom of the CAC, and then be drawn into the engine at once during acceleration (or tip-in) increasing the chance of engine misfire. In one example, cooling ambient airflow traveling to the CAC may be controlled by the grille shutter system 110 such that condensate formation and engine misfire events are reduced.

In the embodiment shown in FIG. 1, the pressure of the air charge within the intake manifold is sensed by manifold air pressure (MAP) sensor 24 and a boost pressure is sensed by boost pressure sensor 124. A compressor by-pass valve (not shown) may be coupled in series between the inlet and the outlet of compressor 14. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 22 is coupled to a series of combustion chambers 31 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system. Universal Exhaust Gas Oxygen (UEGO) sensor 126 is shown coupled to exhaust manifold 36 upstream of turbine 16. Alternatively, a two-state exhaust gas oxygen sensor may be substituted for UEGO sensor 126.

As shown in FIG. 1, exhaust from the one or more exhaust manifold sections is directed to turbine 16 to drive the turbine. When reduced turbine torque is desired, some exhaust may be directed instead through a waste gate (not shown), by-passing the turbine. The combined flow from the turbine and the waste gate then flows through emission control device 70. In general, one or more emission control devices 70 may include one or more exhaust after-treatment catalysts configured to catalytically treat the exhaust flow, and thereby reduce an amount of one or more substances in the exhaust flow.

All or part of the treated exhaust from emission control device 70 may be released into the atmosphere via exhaust conduit 35. Depending on operating conditions, however, some exhaust may be diverted instead to EGR passage 51, through EGR cooler 50 and EGR valve 52, to the inlet of compressor 14. In this manner, the compressor is configured to admit exhaust tapped from downstream of turbine 16. The EGR valve may be opened to admit a controlled amount of cooled exhaust gas to the compressor inlet for desirable combustion and emissions-control performance. In this way, engine system 100 is adapted to provide external, low-pressure (LP) EGR. The rotation of the compressor, in addition to the relatively long LP EGR flow path in engine system 100, provides excellent homogenization of the exhaust gas into the intake air charge. Further, the disposition of EGR take-off and mixing points provides effective cooling of the exhaust gas for increased available EGR mass and improved performance. In other embodiments, the EGR system may be a high pressure EGR system with EGR passage 51 connecting from upstream of the turbine 16 to downstream of the compressor 14.

Motor vehicle 102 further includes a cooling system 104 that circulates coolant through internal combustion engine 10 to absorb waste heat and distributes the heated coolant to radiator 80 and/or heater core 90 via coolant lines 82 and 84, respectively. In particular, FIG. 1 shows cooling system 104 coupled to engine 10 and circulating engine coolant from engine 10 to radiator 80 via engine-driven water pump 86, and back to engine 10 via coolant line 82. Engine-driven water pump 86 may be coupled to the engine via front end accessory drive (FEAD) 88, and rotated proportionally to engine speed via belt, chain, etc. Specifically, engine-driven water pump 86 circulates coolant through passages in the engine block, head, etc., to absorb engine heat, which is then transferred via the radiator 80 to ambient air. In an example where engine-driven water pump 86 is a centrifugal pump, the pressure (and resulting flow) produced may be proportional to the crankshaft speed, which in the example of FIG. 1, is directly proportional to engine speed. In another example, a motor-controlled pump may be used that can be adjusted independently of engine rotation. The temperature of the coolant (e.g., engine coolant temperature, ECT) may be regulated by a thermostat valve 38, located in the cooling line 82, which may be kept closed until the coolant reaches a threshold temperature.

Engine system 100 may include an electric fan 92 for directing cooling airflow toward the CAC 18, engine cooling system 104, or other engine system components. In some embodiments, electric fan 92 may be an engine cooling fan. The engine cooling fan may be coupled to radiator 80 in order to maintain airflow through radiator 80 when vehicle 102 is moving slowly or stopped while the engine is running. Fan rotation speed or direction may be controlled by a controller 12. In one example, the engine cooling fan may also direct cooling airflow toward CAC 18. Alternatively, electric fan 92 may be coupled to the engine accessory drive system, driven by the engine crankshaft. In other embodiments, electric fan 92 may act as a dedicated CAC fan. In this embodiment, the electric fan may be coupled to the CAC or placed in a location to direct airflow directly toward the CAC. In yet another embodiment, there may be two or more electric fans. For example, one may be coupled to the radiator (as shown) for engine cooling, while the other may be coupled elsewhere to direct cooling air directly toward the CAC. In this example, the two or more electric fans may be controlled separately (e.g., at different rotation speeds) to provide cooling to their respective components.

Coolant may flow through coolant line 82, as described above, and/or through coolant line 84 to heater core 90 where the heat may be transferred to passenger compartment 106, and the coolant flows back to engine 10. In some examples, engine-driven water pump 86 may operate to circulate the coolant through both coolant lines 82 and 84.

FIG. 1 further shows a control system 28. Control system 28 may be communicatively coupled to various components of engine system 100 to carry out the control routines and actions described herein. For example, as shown in FIG. 1, control system 28 may include an electronic digital controller 12. Controller 12 may be a microcomputer, including a microprocessor unit, input/output ports, an electronic storage medium for executable programs and calibration values, random access memory, keep alive memory, and a data bus. As depicted, controller 12 may receive input from a plurality of sensors 30, which may include user inputs and/or sensors (such as transmission gear position, gas pedal input (e.g., pedal position), brake input, transmission selector position, vehicle speed, engine speed, mass airflow through the engine, boost pressure, ambient temperature, ambient humidity, intake air temperature, fan speed, etc.), cooling system sensors (such as coolant temperature, fan speed, passenger compartment temperature, ambient humidity, etc.), CAC 18 sensors (such as CAC inlet air temperature and pressure, CAC outlet air temperature and pressure, etc.), and others. In addition, controller 12 may receive data from a GPS 34 and/or an in-vehicle communications and entertainment system 26 of vehicle 102.

The in-vehicle communications and entertainment system 26 may communicate with a wireless communication device 40 via various wireless protocols, such as wireless networks, cell tower transmissions, and/or combinations thereof. Data obtained from the in-vehicle communications and entertainment system 26 may include real-time and forecasted weather conditions. Weather conditions, such as temperature, precipitation (e.g., rain, snow, hail, etc.), and humidity, may be obtained through various wireless communication device applications and weather-forecasting websites. Data obtained from the in-vehicle communications and entertainment system may include current and predicted weather conditions for the current location, as well as future locations along a planned travel route. In one embodiment, where the in-vehicle communications and entertainment system includes a GPS, current and future weather data may be correlated with current and future travel routes displayed on the GPS. In an alternate embodiment, wherein the vehicle system includes a dedicated GPS 34, each of the GPS and the in-vehicle communications and entertainment system may communicate with the wireless communication device 40, as well as with each other, to communicate current and future weather data with current and future travel routes. In one example, the entertainment system may access various weather maps stored on the internet or other cloud computing systems. The stored weather maps may include rain, humidity, precipitation and/or temperature information provided as contour maps, for example. In one example, the wireless communication device 40 may relay real-time humidity data to the in-vehicle communications and entertainment system 26, and/or GPS 34, which is then relayed to the controller 12. The controller 12 compares the received humidity data to threshold values and determines the appropriate engine operating parameter adjustments. In one example, these adjustments may include adjusting the grille shutter system 110. For example, if humidity is greater than a defined threshold, one or more of the grille shutters may be closed.

In other embodiments, the presence of rain may be inferred from other signals or sensors (e.g., rain sensors). In one example, rain may be inferred from a vehicle windshield wiper on/off signal. Specially, in one example, when the windshield wipers are on, a signal may be sent to controller 12 to indicate rain. The controller may use this information to predict the likelihood of condensate formation in the CAC and adjust vehicle actuators, such as electric fan 92 and/or grille shutter system 110.

Furthermore, controller 12 may communicate with various actuators 32, which may include engine actuators (such as fuel injectors, an electronically controlled intake air throttle plate, spark plugs, etc.), cooling system actuators (such as air handling vents and/or diverter valves in the passenger compartment climate control system, etc.), and others. In some examples, the storage medium may be programmed with computer readable data representing instructions executable by the processor for performing the methods described below as well as other variants that are anticipated but not specifically listed.

As noted herein, the amount of waste heat transferred to the coolant from the engine may vary with operating conditions, thereby affecting the amount of heat transferred to the airflows. For example, as engine output torque, or fuel flow, is reduced, the amount of waste heat generated may be proportionally reduced.

Motor vehicle 102 further includes a grille 112 providing an opening (e.g., a grille opening, a bumper opening, etc.) for receiving ambient airflow 116 through or near the front end of the vehicle and into the engine compartment. Such ambient airflow 116 may then be utilized by radiator 80, electric fan 92, and other components to keep the engine and/or transmission cool. Further, the ambient airflow 116 may reject heat from the vehicle air conditioning system and can improve performance of turbo-charged/super-charged engines that are equipped with CAC 18 that reduces the temperature of the air that goes into the intake manifold/engine. In one example, the electric fan 92 may be adjusted to further increase or decrease the airflow to the engine components. In another example, a dedicated CAC fan may be included in the engine system and used to increase or decrease airflow to the CAC.

FIG. 2 shows an example of the CAC 18, radiator 80, electric fan 92, and engine system 100 locations within a vehicle 102 with respect to the grille shutter system 110 and associated ambient airflow 116. Other under hood components (fuel system, batteries, etc.) may benefit from the cooling airflow as well. Thus, grille shutter system 110 may assist cooling system 104 in cooling internal combustion engine 10. In one example, as shown in FIG. 2, grille shutter system 110 may be a dual active grille shutter system comprising two groups of one or more grille shutters 114 configured to adjust the amount of airflow received through grille 112. In another example, the grille shutter system 110 may be an active grille shutter system comprising only one group of one or more grille shutters 114.

Grille shutters 114 may cover a front region of the vehicle spanning from just below the hood to the bottom of the bumper, for example. By covering the vehicle front end, drag is reduced and entry of external cooling air to the radiator 80 and CAC 18 is reduced. In some embodiments, all grille shutters 114 may be moved in coordination by the controller. In other embodiments, grille shutters may be divided into groups and the controller may adjust opening/closing of each region independently. For example, a first group of grille shutters 204 may be positioned in front of the radiator and a second group of grille shutters 206 may be positioned in front of the CAC 18.

As shown in FIG. 2, the first group of grille shutters 204 is positioned vertically above, with respect to a surface on which vehicle 102 sits, the second group of grille shutters 206. As such, the first group of grille shutters 204 may be referred to as the upper grille shutters and the second group of grille shutters 206 may be referred to as the lower grille shutters. An amount of opening of the first group of grille shutters 204 controls an amount of ambient airflow 216 traveling to the radiator 80 and an amount of opening of the second group of grille shutters 206 controls an amount of ambient airflow traveling to the CAC 18. As such, the upper grille shutters may largely affect vehicle drag and engine cooling while the lower grille shutters affect CAC cooling.

In some examples, each group of grille shutters may contain the same number of grille shutters 114, while in other examples one group of grille shutters may contain more than the other. In one embodiment, the first group of grille shutters 204 may contain multiple grille shutters, while the second group of grille shutters 206 contains one grille shutter. In an alternate embodiment, the first group of grille shutters may only contain one grille shutter, while the second group of grille shutters contains multiple grille shutters. In alternate embodiments, all the grille shutters 114 may be included as one group and an amount of opening of the one group of grille shutters 114 may affect vehicle drag, engine cooling, and CAC cooling.

Grille shutters 114 are moveable between an opened position and a closed position, and may be maintained at either position or a plurality of intermediate positions thereof. In other words, opening of grille shutters 114 may be adjusted such that grille shutters 114 are opened partially, closed partially, or cycled between an open position and a closed position to provide airflow for cooling engine compartment components. The open position may be referred to as a maximal amount of opening (or maximal percentage opening) such that the grille shutters are fully open. An amount of opening of the grille shutters 114 or group of grille shutters (e.g., first group of grille shutters 204 or second group of grille shutters 206) may be denoted by a percentage. For example, when the grille shutters are halfway between an opened and closed position, the grille shutters may be 50% open. When the grille shutters are opened to the maximal percentage opening (e.g., an upper threshold amount of opening), the grille shutters may be 100% open.

The grille shutters 114 (e.g., upper grille shutters) may be actuated by a motor 202. Motor 202 may be operatively coupled to the control system 28. As an example, controller 12 may be communicably connected to grille shutter system 110, and may have instructions stored thereon to adjust opening of grille shutters 114. Controller 12 may send signals for adjusting the grille shutter system 110 to motor 202. These signals may include commands to increase or decrease the opening of the upper grille shutters. For example, controller 12 may command the motor 202 to open the upper grille shutters to 30% open. Motor 202 may be coupled to one or more grille shutters 114. For example, motor 202 may be coupled to a first grille shutter 114, the first grille shutter mechanically linked to the remaining grille shutters 114. In another example, motor 202 may be coupled to each grille shutter 114 or each group of grille shutters. Further, in some examples, the grille shutter system 110 may include more than one motor for controller more than one group or more than one individual grille shutter.

Figure 3:
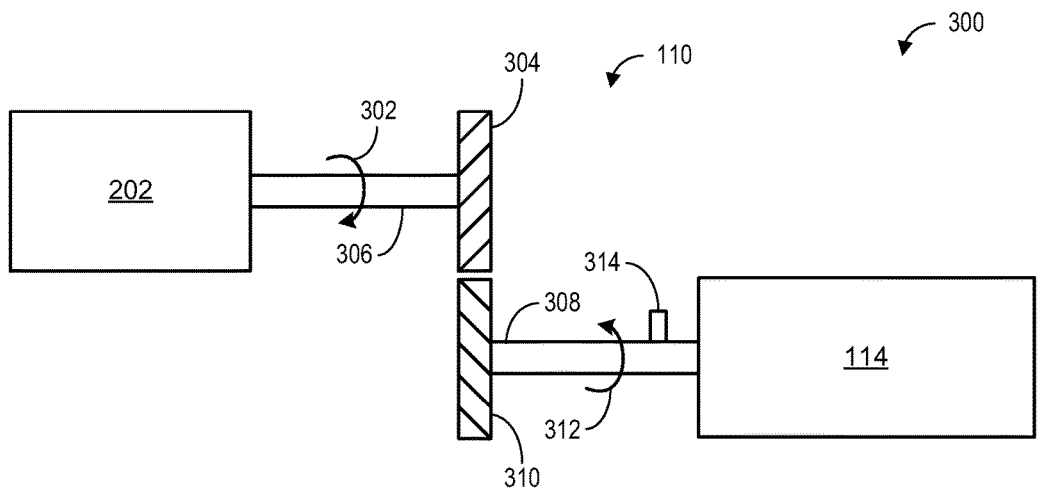
FIG. 3 shows a schematic of a grille shutter system of a vehicle.

FIG. 3 shows a schematic 300 of the grille shutter system 110 including the motor 202 and a single grille shutter 114 of a group of grille shutters. Specifically, schematic 300 shows the motor 202 indirectly coupled to the grille shutter 114 through a series of shafts and gears. The motor 202 is coupled to a first rotatable shaft 302 at a first end of the first shaft 302. A second end of the first shaft 302 is coupled to a first gear 304. As the first shaft 302 rotates in a direction shown by arrow 306, the first gear 304 rotates. As such, the first shaft 302 and the first gear 304 rotate together about a central axis of the first shaft 302. Further, the motor 202 actuates the first shaft 302 to rotate into a plurality of positions.

The individual grille shutter 114 may be referred to as a vane. Schematic 300 shows a front view of the grille shutter vane 114 (with respect to the vehicle front end). As such, airflow from outside of the vehicle may be directed into a plane of the page. The grille shutter vane 114 may be coupled to a second shaft 308 at a first end of the second shaft 308. A second end of the second shaft 308 is coupled to a second gear 310. The first gear 304 interfaces with the second gear 310 such that rotation of the first gear 304 causes rotation of the second gear 310. Specifically, the first gear 304 includes a plurality of teeth offset from a plurality of teeth of the second gear 310. As such, the teeth of the first gear 304 fit between teeth of the second gear 310 and teeth of the second gear 310 fit between teeth of the first gear 304. As shown in the schematic 300, as the first gear 304 rotates in a first direction shown by arrow 306, the second gear consequently rotates in a second direction shown by arrow 312. The second direction is opposite the first direction. As a result of rotating the first shaft 302, the grille shutter vane 114 rotates with the rotation of the second gear 310 and the second shaft 308.

In alternate embodiments, the grille shutters system 110 shown in FIG. 3 may have additional gears and/or shafts coupling the motor 202 to the grille shutter vane 114. Further, additional mechanical components may be included (in addition to those shown in FIG. 3) in the grille shutter system 110 in order to translate movement of the motor 202 into coordinated movement and rotation of the grille shutter vane 114.

In one example, the motor 202 may be a stepper motor. As such, the motor 202 may only move the first shaft 302 into a finite number of positions. Further, the motor 202 may have a minimum amount that it must move with each actuation. For example, the motor 202 may only move in six degree increments. In another example, the motor 202 may move in a different number of degree increments. As such, the motor 202 may have a finite number of motor positions and a desired grille shutter position may not align with an actual resulting grille shutter position after moving the grille shutters with the motor 202. The motor 202 may instead move the grille shutters to the closest available position to the commanded grille shutter position.

Upon receiving a command from a controller, the motor 202 rotates the first shaft 302 into a position corresponding to the commanded grille shutter position. In one example, the command may be a motor position translated from a commanded grille shutter position. In another example, the command may be the commanded grille shutter position which has a corresponding motor position. The commanded grille shutter position may be a percentage opening (or closing) or an opening angle (e.g., opening degree). For example, 0% open may correspond to a grille shutter angle of 0 degrees, measured from a vertical axis of the grille shutter, as shown at FIG. 4 and explained further below. As discussed above, the commanded grille shutter position may not match up with an exact motor position. Thus, the motor 202 may actuate the grille shutter 114 into the position closest to the commanded position. Though the motor 202 is shown coupled to a single grille shutter 114 in FIG. 4, in some embodiments the motor 202 may be coupled to additional grille shutters. Further, the grille shutter 114 shown in FIG. 4 may be mechanically linked (e.g., via a linkage) to additional grille shutters positioned vertically above and/or below the grille shutter 114. As such, rotating the grille shutter 114 shown in FIG. 4 may rotate the other linked grille shutters by the same amount. In this way, the motor 202 may adjust multiple grille shutters 114 or groups of grille shutters together and in parallel with one another.

A position sensor 314 may be coupled along the grille shutter system 110 to provide feedback of an actual grille shutter vane position to a controller (such as controller 12 shown in FIG. 1). As shown in FIG. 4, the position sensor 314 is positioned along the second shaft 308 closer to the end of the second shaft 308 coupled to the grille shutter vane 114. However, in alternate embodiments, the position sensor 314 may be positioned at a different position on the second shaft 308, first shaft 302, or grille shutter vane 114. The output of the position sensor 314 may be a feedback position of the grille shutters.

In some cases, the feedback position of the grille shutters may be different than the commanded position, thereby resulting in a position error. As discussed above, the actual grille shutter vane position may be different than the commanded grille shutter van position due to the available motor increments not matching exactly with the desired vane angle. Additionally, position error may result from gear lash. As discussed above, the first gear 304 and the second gear 310 have teeth that interface together between teeth of the opposite gear. In some examples, the teeth of the gears may be slightly smaller than the space between adjacent teeth. As a result, when the two gears interface together, there may be an amount of space between the interfacing teeth of the two gears. This space or gap between the interfacing teeth may cause some slip or play in the gears. For example, if interfacing teeth are not positioned against one another when a first of the two gears begins to move, the teeth of the first gear may travel a distance before contacting the interfacing teeth of the second gear and subsequently beginning to move the second gear. Thus, the first gear may rotate a first amount before the second gear begins to rotate. As a result, the grille shutter vane 114 may move the target amount minus the first amount, thereby resulting in a position different than the commanded position.

Gear lash may occur to a greater degree when changing a direction of travel of the grille shutters 114. For example, gear lash may occur when transitioning from opening to closing or from closing to opening the grille shutters. Thus, depending on the direction of travel of the grille shutters, the effect of gear lash on grille shutter position may be different. Further details on determining the commanded grille shutter position to account for gear lash, direction of travel (e.g., increasing or decreasing opening percentage), and additional operating conditions such as vehicle speed are presented below with reference to FIGS. 5-6.

FIG. 4 shows example grille shutter positions for a single grille shutter vane 114. Specifically, schematic 400 shows a side view of a grille shutter vane 114 (such as the grille shutter vane 114 shown in FIG. 3). The grille shutter vane 114 rotates about a central axis of the vane and the second shaft 308, as shown in FIG. 3. Schematic 400 shows a rotation point 408 of the grille shutter vane 114. The grille shutter vane 114 rotates between a fully open and fully closed position defined by a vertical axis 410 and lateral axis 412 of the grille shutters.

A first grille shutter position is shown at 402. The first grille shutter position is a closed position in which the grille shutters are fully closed, thereby preventing airflow from entering the vehicle through the grille. The percentage opening when the grille shutters are fully closed is 0%. Likewise, the percent closing when the grille shutters are fully closed is 100%. The grille shutter vane 114 is aligned with the vertical axis 410 such that an angle between the grille shutter vane 114 and the vertical axis 114 is approximately 0°. This angle may be referred to as the opening angle. In other embodiments, the fully closed grille shutter position may be slightly larger than 0° (e.g., 5°) to allow for overlapping of adjacent grille shutters. A force 414 acts on an outside face of the grille shutter vane 114, the force 414 resulting from air flow pushing against the vanes as a vehicle (in which the grille shutters are installed) travels in a forward direction. Consequently, the force 414 increases as the speed of the vehicle (vehicle speed, VS) increases. The force 414 is further based on the percentage opening, the force 414 being greatest at 0% opening (fully closed position shown at 402) and smallest at the maximal percentage opening (fully open position shown at 406). In this way, the force acting on the outside face of the grille shutter vane 114 is a function of vehicle speed and percentage opening, the force increasing with increasing vehicle speed and decreasing percentage opening.

A second grille shutter position is shown at 404. The second grille shutter position is an intermediate position in which the grille shutter vane 114 is partially open (or partially closed). The opening angle 416 is defined between the vertical axis 410 and a vane axis 418 of the grille shutter vane 114. In one example, the opening angle 416 may be approximately 36° such that the percentage opening of the grille shutters is approximately 40%. In another example, the opening angle may be approximately 9° such that the percentage opening of the grille shutters is approximately 10%. In some cases, the controller may also determine a percentage closing of the grille shutters. For example, the percentage closing of the grille shutters may be 100 minus the percentage opening. In the example of the percentage opening being 40%, the percentage closing is 60%. The partially open grille shutter vane 114 allows ambient airflow 116 to flow around the vane, through the opening created by the partially open grille shutter vane 114, and into the vehicle and toward the engine. The force 414 acting on the grille shutter vane 114 (the force perpendicular to the face of the vane) may decrease as the percentage opening and opening angle 416 increases.

A third grille shutter position is shown at 406. The third grille shutter position is a fully open position, thereby allowing maximal ambient airflow 116 to enter the vehicle and engine compartment through the grille. Thus, the fully open position may be referred to herein as a maximal opening or maximal percentage opening. When the grille shutters are fully open, the opening angle is approximately 90° and the percentage opening is 100%. The force 414 on the outer face of the grille shutter vane 114 may have little effect on the resulting grille shutter position since the vanes are fully open. Further, upon reaching the maximal percentage opening of 100% (and an opening angle of 90°), the grille shutter vane 114 may contact an end stop 420. The end stop 420 may be coupled to a support structure (e.g., an outer frame) of the grille shutter system 110. For example, the end stop 420 may be positioned along a lateral axis of at least one grille shutter vane 114 of a group of grille shutters. As such, at least one grille shutter vane 114 of the group of grille shutters may contact the end stop 420 upon reaching the maximal percentage opening of 100%. In response to the grille shutter vane 114 contacting the end stop, the controller may detect a stall current. Thus, detecting the stall current may verify the grille shutters are at the maximal percentage opening.

In this way, grille shutter vanes 114 of a grille shutter system 110 may be adjusted into a plurality of positions between 0% open (fully closed position) and 100% open (maximal percentage opening or fully open position). A motor may actuate the grille shutters into different positions based on a commanded grille shutter position.

The system of FIGS. 1-4 provides for a system comprising grille shutters positioned at a vehicle front end, a motor coupled to the grille shutters and operable to adjust a position of the grille shutters, and a controller with memory and computer readable instructions stored thereon for adjusting the motor based on a commanded percentage opening of the grille shutters, the commanded percentage opening based on a determined direction of motion of the grille shutters, a desired opening of the grille shutters, and a current vehicle speed. The computer readable instructions include instructions for determining the determined direction of motion of the grille shutters based on a comparison between a desired motor position and a previous desired motor position, the desired motor position corresponding to the commanded percentage opening.

An opening map may be stored in the memory of the controller and the computer readable instructions further include instructions for looking up the commanded percentage opening of the grille shutters within the opening map when the grille shutters are moving in an opening direction. Additionally, a closing map may be stored in the memory of the controller and the computer readable instructions further include instructions for looking up the commanded percentage opening of the grille shutters within the closing map when the grille shutters are moving in a closing direction.

A desired grille shutter position (percentage opening) may be based on engine operating conditions such as engine coolant temperature (ECT), driving conditions, pedal position, CAC efficiency, CAC temperature, and/or vehicle speed. A motor coupled to the grille shutters may adjust the grille shutters based on a command received from the controller. However, if the controller sends the desired grille shutter position to the motor, the resulting (actual) position of the grille shutters may be different. For example, if the desired percentage opening is 40%, the actual resulting grille shutter position after motor adjustment may be 20% (or some other percentage different than 40%).

As discussed above, the actual measured grille shutter vane position (e.g., measured by the position sensor) may be significantly different than the commanded vane position due to gear lash in the grille shutter vane mechanism. This difference (position error) may be significant enough to adversely affect fuel economy. If the controller instead commands the grille shutters to open by a greater amount than desired, the resulting grille shutter position may be closer to the desired grille shutter position, thereby decreasing grille shutter position error and increasing fuel economy. For example, if the desired percentage opening is 40%, the commanded percentage opening may be 65%. The motor may then actuate the grille shutters to open by 65%. However, the resulting grille shutter position may be approximately 40%. In this way, the commanded grille shutter position may be different than the desired grille shutters position.

The commanded grille shutter position may be based on the desired grille shutter position and additional operating conditions that may alter the final position of the grille shutters. For example, as described above, gear lash in the grille shutter system may cause grille shutter position error. In some examples, the grille shutter gear lash may be quantified and then used to create a map or relationship between commanded percentage opening of the grille shutters and desired percentage opening of the grille shutters. Specifically, a map of commanded percent openings corresponding to desired percent openings may be stored in a memory of the controller in the form of a look-up table or map (as shown in FIG. 6, discussed further below). In another example, the controller may use a relationship between desired percent opening and commanded percent opening (for example in the form of a position translator function) to convert a desired percent opening to a commanded percent opening. In some examples, the relationship or map may translate the commanded position into stepper motor counts (positions). In another example, corresponding motor positions may be stored within the look-up table or map.

However, using only a single map or relationship between desired percentage opening and commanded percentage opening may still result in some position error (e.g., difference between commanded and actual, resulting grille shutter position). As introduced above, the gear lash and achievable motor positions may differ depending on whether the grille shutters are moving in an opening direction (e.g., increasing percentage opening) or moving in a closing direction (e.g., decreasing percentage opening). For example, when moving from a closed position to an open position, the grille shutter position error may increase at openings of less than a threshold (e.g., 30%). This may be due to the initial gear lash when transitioning to moving in the opening direction. However, when moving from the open to the closed position the position error may be reduced at openings less than the threshold (e.g., 30%) since the gear lash may already be resolved by the time the grille shutters reach the smaller opening angles.

Thus, the grille shutter position error may be related to the direction of motion of the grille shutter vanes. The grille shutter position error may be further related to vehicle speed. As discussed above, a force acting against the outside surface of the grille shutter vane (e.g., the surface closest to the outside of the vehicle) may result in vane hysteresis, or a change in vane position from the commanded position. For example, as the force increases, the grille shutter vane may be pushed away from the target percentage opening. The force may increase with increasing vehicle speed and decreasing grille shutter angle (e.g., decreasing percentage opening). Thus, the grille shutter position error may be a function of vehicle speed, grille shutter percentage opening, and the direction of motion (e.g., opening or closing) of the grille shutters.

Alternatively, two different maps (or relationships) between desired percentage opening and commanded percentage opening may be stored within the memory of the controller. For example, unique position translator functions may be provided for opening and for closing the grille shutters. The controller may determine the direction of motion of the grille shutters and switch between the two maps based on whether the desired grille shutter percent opening is increasing (opening) or decreasing (closing). As such, the commanded grille shutter position may be based on the direction of motion of the grille shutters, the desired percentage opening, and the vehicle speed.

The grille shutter position maps or relationships may be adjusted for different grille shutter systems, vehicles, suppliers, etc. For example, gear lash may be different for different vehicles and grille shutter systems. Thus, the grille shutter position relationships may be calibrated offline, before vehicle operation. In some examples, the position relationships may be recalibrated and updated after a period of use to account for any degradation or changes within the grille shutter system. Further details on adjusting the grille shutters based on the position maps are described below with reference to FIG. 5. Further, example position maps are shown at FIG. 6.

In this way, adjusting a motor coupled to grille shutters based on a direction of motion of the grille shutters, a desired opening of the grille shutters, and vehicle speed. The method further comprises when a difference between a desired motor position and a current motor position is greater than one motor increment, adjusting the motor into the desired motor position to increase an opening of the grille shutters, the desired motor position based on the desired opening, vehicle speed, and the direction of motion of the grille shutters. Additionally, the method comprises when a difference between a current motor position and a desired motor position is greater than one motor increment, adjusting the motor into the desired motor position to decrease an opening of the grille shutters, the desired motor position based on the desired opening, vehicle speed, and a closing direction. Further still, the method comprises when an absolute value of a difference between a desired motor position and a current motor position is not greater than one motor increment, maintaining the direction of motion of the grille shutters and not adjusting the motor.

The desired opening is based on one or more of engine coolant temperature, vehicle driving conditions, pedal position, charge air cooler efficiency, or vehicle speed. In one example, the motor is a stepper motor, the stepper motor operable to move in increments of a finite size. The method further comprises adjusting the motor by a number of motor increments in order to achieve the desired opening, the number of motor increments increasing for increasing vehicle speed, decreasing desired opening when moving in an opening direction, and increasing desired opening when moving in a closing direction.

Turning now to FIG. 5, a method 500 is shown for adjusting the grille shutters based on a direction of motion of the grille shutters. As described above, a motor coupled to the grille shutters may move the grille shutters into a desired percentage opening (or percentage closing). However, the controller may send a commanded percentage opening to the motor that is different that the desired percentage opening. As such, the commanded percentage opening may be the amount of opening to achieve to desired percentage opening. Further, the direction of motion of the grille shutters may be either an opening direction in which the percentage opening of the grille shutters is increasing or a closing direction in which the percentage opening is decreasing (or the percentage closing is increasing). In one example, the direction of motion may be determined by comparing a desired motor potion to an actual motor position. In another example, the direction of motion may be determined by comparing the desired motor position to a previous motor position (e.g., last received motor position). Instructions for executing method 500 may be stored within a controller (such as controller 12 shown in FIG. 1). The controller may execute method 500 as described below.

The method begins at 502 by estimating and/or measuring engine operating conditions. Engine operating conditions may include engine speed and load, vehicle speed, grille shutter position (actual feedback position from grille shutter position sensor), engine coolant temperature (ECT), pedal position, conditions of the CAC (e.g., temperature and pressure), ambient humidity, a position of the grille shutter motor, etc. At 504, the method includes determining the desired grille shutter position. The desired grille shutter position may be based on engine operating conditions including one or more of ECT, a vehicle driving condition (e.g., whether or not the vehicle is being driven), pedal position, CAC efficiency, CAC temperature, or vehicle speed. The method at 504 may further include determining a desired motor position corresponding to the desired grille shutter position. For example, the motor may be a stepper motor with a finite number of positions. The desired motor position may include a number of counts, motor positions, or motor increments to adjust the motor by. Further, each motor increment may correspond to adjusting the grille shutters by a grille shutter angle of approximately six degrees (or another finite angle). As such the desired motor position may be the motor position closest to the desired grille shutter position.

At 506, the method includes determining if a difference between the desired motor position and the actual motor position is greater than one motor position (or one motor increment or count). The actual motor position may also be referred to as the current motor position. In some examples, the actual motor position may be different than the previous desired motor position (e.g., the last value of the desired motor position) due to the motor moving in increments of a set number. Thus, the method at 506 may include additionally or alternatively determining if the difference between the current desired position and the previous value of the desired motor position is greater than one motor position. If the difference between the desired motor position and the actual motor position (or the difference between the desired motor position and the previous desired motor position) is greater than one motor position, the desired direction of motion of the grille shutters is the opening direction. Said another way, the controller may be commanding the motor to increase the percentage opening of the grille shutters. As a result, the method continues on to 508 to use a grille shutter opening position map. An example of a grille shutter opening position map is shown at 602 of FIG. 6, described further below. In one example, if the grille shutters were initially moving in the closing direction, the method at 508 may include transitioning from using the closing position map to using the opening posing map. As such, the grille shutters may transition from moving in the closing direction to moving in the opening direction. Alternatively, if the grille shutters were initially moving in the opening direction, the method at 508 may include continuing to use the opening position map and continuing to adjust the grille shutters in the opening direction.

At 510, the controller determines the commanded grille shutter position using the opening map. As such, the commanded grille shutter position may be based on the determined desired grille shutter position, a current vehicle speed, and the opening direction. At 512, the method includes translating the commanded grille shutter position into motor increments and then actuating the motor to adjust the grille shutters to the commanded position. For example, at 512 the method may include adjusting the motor by increasing or decreasing the motor position by a certain number of counts or motor positions. The resulting grille shutter position (measured by the position sensor) may be approximately the desired grille shutter position determined at 504.

Returning to 506, if the difference between the desired motor position and the actual motor position is not greater than one motor position, the method continues on to 514. At 514, the method includes determining if a difference between the actual motor position and the desired motor position is greater than one motor position (e.g., motor increment). Alternatively, the method at 514 may include determining if a difference between the previous desired motor position and the current desired motor position is greater than one motor position. If the difference at 514 is greater than one motor position, the desired direction of motion of the grille shutters is the closing direction. Said another way, the controller may be commanding the motor to decrease the percentage opening of the grille shutters (and increase the percentage closing of the grille shutters). As a result, the method continues on to 516 to use a grille shutter closing position map. An example of a grille shutter closing position map is shown at 604 of FIG. 6, described further below. If the grille shutters were previously moving in an opening direction, the method at 516 may include transitioning from using the opening position map to using the closing position map. Further, the grille shutters may transition from moving in the opening direction to moving in the closing direction. However, if the grille shutters were moving in the closing direction, the closing direction of travel may be maintained and the method at 516 may include continuing to use the closing position map.

At 518, the controller determines the commanded grille shutter position using the closing map. As such, the commanded grille shutter position may be based on the determined desired grille shutter position, a current vehicle speed, and the closing direction. At 512, the method includes translating the commanded grille shutter position into motor increments and then actuating the motor to adjust the grille shutters to the commanded position. The resulting grille shutter position (measured by the position sensor) may be approximately the desired grille shutter position determined at 504.

Returning to 514, if the difference between the actual motor position and the desired motor position is not greater than one motor position, the method continues on to 520. At 520, the method includes not changing the direction of movement of the grille shutters and continuing to use the current position map. Further, the method at 520 may include not adjusting the grille shutters since the motor cannot move in partial motor increments.

FIG. 6 shows example position maps for determining a commanded grille shutter position. A grille shutter opening position map (e.g., opening map) 602 displays a relationship between commanded percentage opening of the grille shutters (to achieve the target desired percentage opening) and the desired percentage opening. The desired percentage opening and the commanded percentage opening may be an amount of grille shutter opening which may correspond to the grille shutter angle, as depicted in FIG. 4. Further, the relationship between commanded grille shutter position and desired grille shutter position may be based on vehicle speed. The opening map 602 includes a first plot 606 of commanded percentage opening at different desired percentage openings and a first vehicle speed. The opening map 602 further includes a second plot 608 of commanded percentage opening at different desired percentage openings and a second vehicle speed, the first vehicle speed greater than the second vehicle speed.

As vehicle speed increases, a force against the outer surface of the grille shutters (the surface closer to the outside of the vehicle than the inside of the vehicle) may increase. This may cause the grille shutters to open by a smaller amount than commanded. Thus, the commanded grille shutter opening may increase as vehicle speed increases. For example, at a desired percentage opening of X %, the commanded percentage opening is greater at the first, higher vehicle speed (plot 606) than at the second, lower vehicle speed (plot 608).

The opening map 602 may include a plurality of lines, or relationships, at different vehicle speeds. In one example, the opening map 602 may be stored in the memory of the controller as a look-up table. In this way, for a desired percentage opening and vehicle speed there may be a corresponding commanded percentage opening. For example, the controller may input the desired grille shutter position (e.g., percentage opening) and the vehicle speed into the look-up table and receive a corresponding commanded grille shutter position. In another example, a mathematical relationship (e.g., position translator function) may be stored within the controller that may determine the commanded percentage opening based on the desired percentage opening and the vehicle speed.

A similar map, table, or relationship may be stored within the controller for determining a commanded percentage closing of the grille shutters. Specifically, FIG. 6 shows a grille shutter closing position map (e.g., closing map) 604 displaying a relationship between commanded percentage closing of the grille shutters (to achieve the target desired percentage closing) and the desired percentage closing. The desired percentage closing and the commanded percentage closing may be an amount of grille shutter closing which may correspond to the grille shutter angle, as depicted in FIG. 4. Additionally, in some examples a desired percentage opening may be converted to the desired percentage closing. Further, as described above, the relationship between commanded grille shutter position and desired grille shutter position may be based on vehicle speed. The closing map 604 includes a first plot 610 of commanded percentage closing at different desired percentage closings and a first vehicle speed. The closing map 604 further includes a second plot 612 of commanded percentage closing at different desired percentage closings and a second vehicle speed, the first vehicle speed greater than the second vehicle speed.

As vehicle speed increases, a force against the outer surface of the grille shutters (the surface closer to the outside of the vehicle than the inside of the vehicle) may increase. This may cause the grille shutters to close by a smaller amount than commanded. Thus, the commanded grille shutter closing may increase as vehicle speed increases. For example, at a desired percentage closing of X %, the commanded percentage closing is greater at the first, higher vehicle speed (plot 606) than at the second, lower vehicle speed (plot 608).

Similarly to the opening map 602, the closing map 604 may include a plurality of lines, or relationships, at different vehicle speeds. In one example, the closing map 604 may be stored in the memory of the controller as a look-up table. In this way, for a desired percentage closing and vehicle speed there may be a corresponding commanded percentage closing. For example, the controller may input the desired grille shutter position (e.g., percentage closing) and the vehicle speed into the look-up table and receive a corresponding commanded grille shutter position. In another example, a mathematical relationship (e.g., position translator function) may be stored within the controller that may determine the commanded percentage closing based on the desired percentage closing and the vehicle speed. In yet another example, input into and/or the output of the map or relationship may be a percentage opening for the closing direction (e.g., the x and y axis of the closing map may be translated to corresponding opening percentages).

As described above, the motor may be a stepper motor. The controller may adjust the motor by a number of motor increments upon determining the commanded grille shutter position from the desired grille shutter position using one of the opening map 602 or the closing map 604. Said another way, the controller may increase or decrease the motor position by the number of motor increments. For a set desired percentage opening or closing, the corresponding commanded percentage opening or closing may increase as vehicle speed increases. As such, the number of motor increments in order to achieve the desired grille shutter position may increase with increasing vehicle speed. Further, for a set vehicle speed, as the desired percentage opening decreases, the difference between the desired percentage opening and the commanded percentage opening may increase. Thus, the number of motor increments needed to obtain the desired percentage opening my increase with decreasing percentage opening when moving in the opening direction. Likewise, for a set vehicle speed, as the desired percentage closing decreases, the difference between the desired percentage closing and the commanded percentage closing may increase. Thus, the number of motor increments need to obtain the desired percentage closing may increase with decreasing percentage closing. As the percentage closing decreases, the percentage opening increases. Therefore, when considering the closing map 604, it may also be true that the number of motor increments may increase with increasing desired percentage opening when moving in the closing direction.

As such, a method may include during a first condition when grille shutters are moving in an opening direction, adjusting the grille shutters based on a first relationship between grille shutter position and vehicle speed. Then, during a second condition when the grille shutters are closing, the method may include adjusting the grille shutters based on a second relationship between grille shutter position and vehicle speed, the first relationship different than the second relationship.

The first relationship is a relationship between a commanded percentage opening of the grille shutters, vehicle speed, and a desired percentage opening of the grille shutters. Adjusting the grille shutters during the first condition includes increasing an opening of the grille shutters by a first amount, the first amount increasing with increasing vehicle speed and decreasing desired percentage opening. The second relationship is a relationship between a commanded percentage closing of the grille shutters, vehicle speed, and a desired percentage closing of the grille shutters. Adjusting the grille shutters during the second conditions includes decreasing an opening of the grille shutters by a second amount, the second amount increasing with increasing vehicle speed and decreasing desired percentage closing.

In one example, adjusting the grille shutters includes adjusting a stepper motor coupled to the grille shutters into a desired motor position, the desired motor position including a number of motor counts, each motor count corresponding to a change in grille shutter opening angle by six degrees. When a difference between a current motor position and the desired motor position is greater than one, the method may include transitioning from the opening direction to the closing direction and transitioning from adjusting the grille shutters based on the first relationship to adjusting the grille shutters based on the second relationship. The method may further include when a difference between the desired motor position and a current motor position is greater than one, transitioning from the closing direction to the opening direction and transitioning from adjusting the grille shutters based on the second relationship to adjusting the grille shutters based on the first relationship. Further still, the method may include when an absolute value of a difference between a current motor position and the desired motor position is not greater than one, maintaining a current direction of motion of the grille shutters and not adjusting the grille shutters.

In this way, a technical effect of the invention is achieved by adjusting grille shutters based on a desired grille shutter position, the direction of motion of the grille shutters, and vehicle speed, thereby reducing position error of the grille shutters. Reducing the position error may increase fuel economy while also providing adequate cooling to the engine system.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating movable vehicle grille shutters, comprising:
during a first condition when grille shutters are moving in an opening direction to a desired percentage opening, adjusting the grille shutters by increasing a commanded percentage opening of the grille shutters as vehicle speed increases and as the desired percentage opening decreases; and
during a second condition when the grille shutters are moving in a closing direction to a desired percentage closing, adjusting the grille shutters by increasing a commanded percentage closing of the grille shutters as vehicle speed increases and as the desired percentage closing decreases.

2. The method of claim 1, wherein adjusting the grille shutters during the first condition further includes adjusting the commanded percentage opening of the grille shutters based on the desired percentage opening of the grille shutters.

3. The method of claim 1, wherein adjusting the grille shutters includes adjusting a stepper motor coupled to the grille shutters into a desired motor position, the desired motor position including a number of motor counts, each motor count corresponding to a change in grille shutter opening angle by six degrees.

4. The method of claim 3, further comprising, when a difference between a current motor position and the desired motor position is greater than one motor count, moving the grille shutters in the closing direction.

5. The method of claim 4, further comprising, when the difference between the desired motor position and the current motor position is greater than one motor count, moving the grille shutters in the opening direction.

6. The method of claim 4, further comprising, when an absolute value of the difference between the current motor position and the desired motor position is not greater than one motor count, maintaining a current direction of motion of the grille shutters and not adjusting the grille shutters.

* * * * *